United States Patent
Kwong et al.

(10) Patent No.: US 10,324,496 B2
(45) Date of Patent: Jun. 18, 2019

(54) COVER GLASS ARRANGEMENT FOR AN ELECTRONIC DEVICE

(71) Applicant: Apple Inc., Cupertino, CA (US)

(72) Inventors: Kelvin Kwong, San Jose, CA (US); Lee E. Hooton, Cupertino, CA (US); David G. Havskjold, Portola Valley, CA (US); Anthony S. Montevirgen, San Francisco, CA (US); Emery A. Sanford, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/628,823

(22) Filed: Jun. 21, 2017

(65) Prior Publication Data

US 2017/0285686 A1 Oct. 5, 2017

Related U.S. Application Data (63) Continuation of application No. 14/875,402, filed on Oct. 5, 2015, now Pat. No. 9,716,815, which is a
(Continued)

(51) Int. Cl.
*G06F 1/16* (2006.01)
*G06F 3/041* (2006.01)
(Continued)

(52) U.S. Cl.
CPC .......... *G06F 1/1637* (2013.01); *G06F 1/1656* (2013.01); *G06F 1/1686* (2013.01);
(Continued)

(58) Field of Classification Search
CPC .... G06F 1/1637; G06F 1/1686; G06F 1/1656; G06F 3/0414; G06F 2203/04104; G06F 3/044
See application file for complete search history.

(56) References Cited

U.S. PATENT DOCUMENTS 2,248,955 A 7/1941 Capps
2,854,794 A 10/1958 Luedeman
(Continued)

FOREIGN PATENT DOCUMENTS

CN 2657304 11/2004
CN 102131356 7/2011
(Continued)

OTHER PUBLICATIONS

Schmid et al., "Effect of Crystal Orientation and Temperature on the Strength of Sapphire," J.Am.Ceram.Soc., 81, 1998, pp. 885-893.
(Continued)

*Primary Examiner* — Gevell V Selby
(74) *Attorney, Agent, or Firm* — Brownstein Hyatt Farber Schreck, LLP (57) ABSTRACT

An electronic device can include a camera and a cover glass arrangement disposed over the camera. The cover glass arrangement includes a thinner region or cover glass that is positioned over a light-receiving region of the camera. Additionally, the thinner region or cover glass can be disposed over the light-receiving region and at least parts of one or more non-light receiving regions of the camera.

20 Claims, 4 Drawing Sheets

Related U.S. Application Data continuation of application No. 14/103,661, filed on Dec. 11, 2013, now Pat. No. 9,154,678.

(51) Int. Cl.
   *G06F 3/044* (2006.01)
   *H04N 5/225* (2006.01)

(52) U.S. Cl.
   CPC ........... *H04N 5/2254* (2013.01); *G06F 3/044* (2013.01); *G06F 3/0414* (2013.01); *G06F 2203/04104* (2013.01); *Y10T 29/49* (2015.01); *Y10T 29/49826* (2015.01)

(56) References Cited

U.S. PATENT DOCUMENTS

| | | |
|---|---|---|
| 3,658,631 A | 4/1972 | Shaw et al. |
| 3,753,775 A | 8/1973 | Robinson et al. |
| 3,911,670 A | 10/1975 | Hofer |
| 3,964,942 A | 1/1976 | Berkenblit et al. |
| 4,008,111 A | 2/1977 | Rutz |
| 4,054,895 A | 10/1977 | Ham |
| 4,070,211 A | 1/1978 | Harari |
| 4,085,302 A | 4/1978 | Zenk et al. |
| 4,339,300 A | 7/1982 | Noble |
| 4,393,578 A | 7/1983 | Cady et al. |
| 4,459,038 A | 7/1984 | Lederrey |
| 4,473,306 A | 9/1984 | Lederrey |
| 4,662,124 A | 5/1987 | Kato et al. |
| 4,732,867 A | 3/1988 | Schnable |
| 4,735,917 A | 4/1988 | Flatley et al. |
| 4,775,641 A | 10/1988 | Duffy et al. |
| 4,826,300 A | 2/1989 | Efron et al. |
| 4,811,004 A | 3/1989 | Person et al. |
| 4,849,299 A | 7/1989 | Loth |
| 4,908,074 A | 3/1990 | Hosoi et al. |
| 4,946,546 A | 8/1990 | Bourgeois |
| 5,069,743 A | 12/1991 | Wysocki et al. |
| 5,151,389 A | 9/1992 | Zappella |
| 5,154,023 A | 10/1992 | Sioshansi |
| 5,377,669 A | 1/1995 | Schulz |
| 5,413,360 A | 5/1995 | Atari et al. |
| 5,427,051 A | 6/1995 | Maxwell et al. |
| 5,441,591 A | 8/1995 | Imthurn et al. |
| 5,451,553 A | 9/1995 | Scott et al. |
| 5,543,630 A | 8/1996 | Bliss et al. |
| 5,549,746 A | 8/1996 | Scott et al. |
| 5,627,109 A | 5/1997 | Sassa et al. |
| 5,661,313 A | 8/1997 | Dubbelday et al. |
| 5,697,998 A | 12/1997 | Platus et al. |
| 5,702,654 A | 12/1997 | Chen et al. |
| 5,804,522 A | 9/1998 | Uegami |
| 5,839,424 A | 11/1998 | Hauser |
| 5,852,622 A | 12/1998 | Meissner et al. |
| 5,877,094 A | 3/1999 | Egley et al. |
| 5,904,136 A | 5/1999 | Nagatsuka et al. |
| 6,012,303 A | 1/2000 | Axelson et al. |
| 6,024,814 A | 2/2000 | Banzawa et al. |
| 6,025,060 A | 2/2000 | Meissner et al. |
| 6,028,711 A | 2/2000 | Adachi |
| 6,028,762 A | 2/2000 | Kamitani |
| 6,030,849 A | 2/2000 | Hasegawa et al. |
| 6,038,079 A | 3/2000 | Michaels |
| 6,119,673 A | 9/2000 | Nakaura |
| 6,123,026 A | 9/2000 | Gottlieb |
| 6,159,285 A | 12/2000 | Toombs et al. |
| 6,265,089 B1 | 7/2001 | Fatemi et al. |
| 6,327,376 B1 * | 12/2001 | Harkin ................... G01B 7/004 356/71 |
| 6,379,985 B1 | 4/2002 | Cervantes et al. |
| 6,406,769 B1 | 6/2002 | Delabre |
| 6,424,017 B2 | 7/2002 | Kurtz et al. |
| 6,483,237 B2 | 11/2002 | Eastlund et al. |
| 6,489,221 B2 | 12/2002 | Gehrke et al. |
| 6,491,424 B1 | 12/2002 | Tardy |
| 6,514,576 B1 | 2/2003 | Kintaka et al. |
| 6,524,162 B1 | 2/2003 | Hauser |
| 6,547,722 B1 | 4/2003 | Higuma et al. |
| 6,586,819 B2 | 7/2003 | Matsuoka |
| 6,642,989 B2 | 11/2003 | Umehara et al. |
| 6,683,276 B2 | 1/2004 | Mosavi |
| 6,775,073 B2 | 8/2004 | Fukazawa |
| 6,809,010 B1 | 10/2004 | Kinoshita et al. |
| 6,818,532 B2 | 11/2004 | Moeggenborg et al. |
| 6,819,693 B2 | 11/2004 | Derriey et al. |
| 6,849,524 B2 | 2/2005 | Shelton et al. |
| 6,852,253 B2 | 2/2005 | Tomioka |
| 6,858,274 B2 | 2/2005 | Fukazawa |
| 6,864,459 B2 | 3/2005 | Chang et al. |
| 6,872,108 B2 | 3/2005 | Hsu |
| 6,875,099 B2 | 4/2005 | Tatartchenko et al. |
| 6,911,375 B2 | 6/2005 | Mack, III et al. |
| 6,941,940 B1 | 9/2005 | Zavattari et al. |
| 7,018,709 B2 | 3/2006 | Stevenson et al. |
| 7,030,417 B2 | 4/2006 | Bakshi et al. |
| 7,074,652 B2 | 7/2006 | Kumaran et al. |
| 7,128,846 B2 | 10/2006 | Gaudin et al. |
| 7,137,865 B2 | 11/2006 | Hammer et al. |
| 7,151,045 B2 | 12/2006 | Hasegawa et al. |
| 7,171,290 B2 | 1/2007 | Morinaga et al. |
| 7,208,096 B2 | 4/2007 | Cherian et al. |
| 7,255,740 B2 | 8/2007 | Sprenger et al. |
| 7,268,741 B2 | 9/2007 | Sarabandi et al. |
| 7,285,168 B2 | 10/2007 | Bradaczek et al. |
| 7,390,702 B2 | 6/2008 | Nakamura |
| 7,495,615 B2 | 2/2009 | Yamanaka et al. |
| 7,499,093 B2 | 3/2009 | Campbell |
| 7,561,351 B2 | 7/2009 | Konno |
| 7,616,951 B2 | 11/2009 | Chang et al. |
| 7,619,567 B2 | 11/2009 | Lynch et al. |
| 7,663,189 B2 | 2/2010 | Fukuda |
| 7,683,838 B2 | 3/2010 | Koyama et al. |
| 7,704,321 B2 | 4/2010 | Riman et al. |
| 7,803,451 B2 | 9/2010 | Lee et al. |
| 7,807,549 B2 | 10/2010 | Tong et al. |
| 7,883,557 B2 | 2/2011 | Liu et al. |
| 7,902,474 B2 | 3/2011 | Mittleman et al. |
| 7,943,241 B2 | 5/2011 | Kurokawa et al. |
| 7,943,953 B2 | 5/2011 | Sakamoto et al. |
| 7,956,356 B2 | 6/2011 | Tanikella et al. |
| 7,966,785 B2 | 6/2011 | Zadesky et al. |
| 7,977,587 B2 | 7/2011 | Rajagopal et al. |
| 7,999,895 B2 | 8/2011 | Tan et al. |
| 8,003,189 B2 | 8/2011 | Jones et al. |
| 8,014,142 B2 | 9/2011 | Prest et al. |
| 8,070,546 B2 | 12/2011 | Joo et al. |
| 8,157,912 B2 | 4/2012 | Wei |
| 8,158,900 B2 | 4/2012 | Maatta |
| 8,197,303 B2 | 6/2012 | Tanikella et al. |
| 8,259,901 B1 | 9/2012 | Kamireddi |
| 8,268,656 B2 | 9/2012 | Kajiyama |
| 8,304,325 B2 | 11/2012 | Fujii et al. |
| 8,390,023 B2 | 3/2013 | Armitage et al. |
| 8,424,746 B2 | 4/2013 | Adachi et al. |
| 8,455,879 B2 | 6/2013 | Tanikella et al. |
| 8,481,460 B2 | 7/2013 | Goyal |
| 8,616,024 B2 | 12/2013 | Cornejo et al. |
| 8,624,759 B2 | 1/2014 | Maenpaa et al. |
| 8,652,658 B2 | 2/2014 | Tatartchenko et al. |
| 8,691,364 B2 | 4/2014 | Hasegawa et al. |
| 8,721,917 B2 | 5/2014 | Cherian et al. |
| 8,859,446 B2 | 10/2014 | Ozaki et al. |
| 8,882,077 B2 | 11/2014 | Stoddard |
| 8,894,868 B2 | 11/2014 | Hooper et al. |
| 8,937,689 B2 | 1/2015 | Prest et al. |
| 8,951,630 B2 | 2/2015 | Tosatti et al. |
| 8,964,513 B2 | 2/2015 | Derriey et al. |
| 9,011,997 B2 | 4/2015 | Weber |
| 9,012,045 B2 | 4/2015 | Krell et al. |
| 9,120,960 B2 | 9/2015 | Bakshi et al. |
| 9,154,678 B2 | 10/2015 | Kwong et al. |
| 9,221,289 B2 | 12/2015 | Prest et al. |
| 9,225,056 B2 | 12/2015 | Pope et al. |
| 9,232,672 B2 | 1/2016 | Kwong et al. |

(56) References Cited

U.S. PATENT DOCUMENTS

| | | | |
|---|---|---|---|
| 9,346,130 | B2 | 5/2016 | Lei et al. |
| 9,718,249 | B2 | 8/2017 | Kwong |
| 2002/0017653 | A1 | 2/2002 | Chuang |
| 2002/0167068 | A1 | 11/2002 | Hsu et al. |
| 2002/0168837 | A1 | 11/2002 | Hsu et al. |
| 2006/0003587 | A1 | 1/2006 | Hsu et al. |
| 2006/0043396 | A1 | 3/2006 | Tsuda et al. |
| 2006/0055619 | A1 | 3/2006 | Sarabandi et al. |
| 2006/0162849 | A1 | 7/2006 | Han |
| 2006/0196849 | A1 | 9/2006 | Moeggenborg et al. |
| 2007/0193986 | A1 | 8/2007 | Schulz et al. |
| 2007/0204493 | A1 | 9/2007 | Foley et al. |
| 2008/0145632 | A1 | 6/2008 | Nagami |
| 2008/0264767 | A1 | 10/2008 | Chen et al. |
| 2009/0035504 | A1 | 2/2009 | Pishchik et al. |
| 2009/0130415 | A1 | 5/2009 | Mack, III et al. |
| 2009/0268019 | A1 | 10/2009 | Ishii et al. |
| 2009/0321234 | A1 | 12/2009 | Yu et al. |
| 2011/0019354 | A1 | 1/2011 | Prest et al. |
| 2011/0062394 | A1 | 3/2011 | Kumaran et al. |
| 2011/0168005 | A1 | 7/2011 | Pluen et al. |
| 2011/0177300 | A1 | 7/2011 | Hankey et al. |
| 2011/0195560 | A1 | 8/2011 | Gaudin et al. |
| 2011/0223840 | A1 | 9/2011 | Morinaga et al. |
| 2012/0000415 | A1 | 1/2012 | D'Evelyn et al. |
| 2012/0038471 | A1 | 2/2012 | Kim et al. |
| 2012/0068213 | A1 | 3/2012 | Zhang et al. |
| 2012/0111726 | A1 | 5/2012 | Couto Petri et al. |
| 2012/0118228 | A1 | 5/2012 | Lee et al. |
| 2012/0212890 | A1 | 8/2012 | Hoshino et al. |
| 2012/0229424 | A1 | 9/2012 | Behles et al. |
| 2012/0314309 | A1* | 12/2012 | Tatebayashi ..... B29D 11/00413 359/819 |
| 2013/0051586 | A1* | 2/2013 | Stephanou ............... H04R 1/04 381/173 |
| 2013/0102359 | A1 | 4/2013 | Ho |
| 2013/0108124 | A1* | 5/2013 | Wickboldt ......... G06K 9/00053 382/124 |
| 2013/0127879 | A1* | 5/2013 | Burns ................... G01L 9/0051 345/501 |
| 2013/0176484 | A1 | 7/2013 | Pilliod et al. |
| 2013/0236699 | A1 | 9/2013 | Prest et al. |
| 2013/0237402 | A1 | 9/2013 | Wang et al. |
| 2013/0278646 | A1* | 10/2013 | Nakamura ............... G06F 3/011 345/690 |
| 2014/0083353 | A1 | 3/2014 | Pope et al. |
| 2016/0028931 | A1 | 1/2016 | Kwong et al. |
| 2016/0087332 | A1 | 3/2016 | Pope et al. |
| 2017/0001266 | A1 | 1/2017 | Li et al. |

FOREIGN PATENT DOCUMENTS

| | | |
|---|---|---|
| CN | 202262106 | 5/2012 |
| CN | 203086550 | 7/2013 |
| DE | 202008002512 | 6/2008 |
| EP | 0305626 | 3/1989 |
| EP | 1013802 | 6/2000 |
| EP | 1829846 | 9/2007 |
| EP | 2520401 | 11/2012 |
| GB | 1135886 | 12/1968 |
| JP | 54032062 | 3/1979 |
| JP | 1173764 | 7/1989 |
| JP | 2039578 | 2/1990 |
| JP | 3021048 | 1/1991 |
| JP | 03115200 | 5/1991 |
| JP | 3177335 | 8/1991 |
| JP | 3250659 | 11/1991 |
| JP | 5027257 | 2/1993 |
| JP | 5085894 | 4/1993 |
| JP | 5313103 | 11/1993 |
| JP | 5333164 | 12/1993 |
| JP | 5335435 | 12/1993 |
| JP | 06242260 | 9/1994 |
| JP | 6314694 | 11/1994 |
| JP | 06337292 | 12/1994 |
| JP | 7129952 | 5/1995 |
| JP | 07145000 | 6/1995 |
| JP | 07206600 | 8/1995 |
| JP | 8040797 | 2/1996 |
| JP | 8148594 | 6/1996 |
| JP | 09008690 | 1/1997 |
| JP | H0933456 | 2/1997 |
| JP | 9213773 | 8/1997 |
| JP | 9270565 | 10/1997 |
| JP | 9295895 | 11/1997 |
| JP | 10239520 | 9/1998 |
| JP | 10269543 | 10/1998 |
| JP | 10275955 | 10/1998 |
| JP | 10335259 | 12/1998 |
| JP | 2849602 | 1/1999 |
| JP | 11135889 | 5/1999 |
| JP | 2000183203 | 6/2000 |
| JP | 2000196149 | 7/2000 |
| JP | 2001134927 | 5/2001 |
| JP | 2001176993 | 6/2001 |
| JP | 2001237335 | 8/2001 |
| JP | 2001298170 | 10/2001 |
| JP | 2002015977 | 1/2002 |
| JP | 2002109854 | 4/2002 |
| JP | 2002184845 | 6/2002 |
| JP | 2002201096 | 7/2002 |
| JP | 2002255694 | 9/2002 |
| JP | 2002289529 | 10/2002 |
| JP | 2002293692 | 10/2002 |
| JP | 2003015156 | 1/2003 |
| JP | 2003069176 | 3/2003 |
| JP | 2003133802 | 5/2003 |
| JP | 2003137690 | 5/2003 |
| JP | 2003245847 | 9/2003 |
| JP | 2003277194 | 10/2003 |
| JP | 2003282551 | 10/2003 |
| JP | 2003332234 | 11/2003 |
| JP | 2004111848 | 4/2004 |
| JP | 2004168622 | 6/2004 |
| JP | 2004288934 | 10/2004 |
| JP | 2004296575 | 10/2004 |
| JP | 2004296701 | 10/2004 |
| JP | 2004296912 | 10/2004 |
| JP | 2005047718 | 2/2005 |
| JP | 2005064492 | 3/2005 |
| JP | 2005079171 | 3/2005 |
| JP | 2005085888 | 3/2005 |
| JP | 2005101230 | 4/2005 |
| JP | 2005104742 | 4/2005 |
| JP | 2005136106 | 5/2005 |
| JP | 2005150523 | 6/2005 |
| JP | 2005277334 | 10/2005 |
| JP | 2005285869 | 10/2005 |
| JP | 2005314121 | 11/2005 |
| JP | 2006016230 | 1/2006 |
| JP | 2006016239 | 1/2006 |
| JP | 2006062931 | 3/2006 |
| JP | 2006066442 | 3/2006 |
| JP | 2006232639 | 9/2006 |
| JP | 2006232640 | 9/2006 |
| JP | 2006339308 | 12/2006 |
| JP | 2007010730 | 1/2007 |
| JP | 2007150072 | 6/2007 |
| JP | 2007237627 | 9/2007 |
| JP | 2007237628 | 9/2007 |
| JP | 2007269577 | 10/2007 |
| JP | 2008111984 | 5/2008 |
| JP | 2008211040 | 9/2008 |
| JP | 2008297150 | 12/2008 |
| JP | 2009040639 | 2/2009 |
| JP | 2009263534 | 11/2009 |
| JP | 2010056485 | 3/2010 |
| JP | 2011241190 | 12/2011 |
| KR | 20100090897 | 8/2010 |
| TW | 200909216 | 3/2009 |
| TW | 201117248 | 5/2011 |
| TW | M438642 | 10/2012 |
| WO | WO98/56575 | 12/1998 |

(56) References Cited

FOREIGN PATENT DOCUMENTS

| | | |
|---|---|---|
| WO | WO02/054718 | 7/2002 |
| WO | WO2004/059731 | 7/2004 |
| WO | WO2007/143480 | 12/2007 |
| WO | WO2008/036888 | 3/2008 |
| WO | WO2008/093704 | 8/2008 |
| WO | WO2008/122296 | 10/2008 |
| WO | WO2009/025842 | 2/2009 |
| WO | WO2009/151160 | 12/2009 |
| WO | WO2010/057842 | 2/2010 |
| WO | WO2010/090116 | 8/2010 |
| WO | WO2013/100067 | 7/2013 |

OTHER PUBLICATIONS

Quick, Darren, "Aston Martin teams with Mobiado for transparent touchscreen concept phone," Mar. 28, 2011, pp. 1-5, retrieved from the internet: URL:http://www-gizmag.com/cpt002-aston-martin-concept-phone/18248.

Zahler, James, "Sapphire and GaN Substrate Materials," DOE SSL Manufacturing R&D Workshop 2012, Presentation, Apr. 14, 2012, pp. 1-19.

Flores, Marc, "Can a Case Scratch the iPhone 4's Glass and Shatter it?," Oct. 8, 2010, pp. 1-10, retrieved from the internet: URL:http://www.intomobile.com/2010/10/08/glassgate-iphone-4.

Sykes, Neil, "The Use of Lasers in Target Manufacture," 2010, pp. 1-24, retrieved from the internet: URL:heep://www.stfc.ac.uk/CLF/resources/PDF/events_3effw_weds_sykes.pdf.

Watanabe, "Twinned Crystals of Corundum Grown from Cryolite Flux," Crystal Research Technology, vol. 24, 1989, pp. 197-1205.

\* cited by examiner

COVER GLASS ARRANGEMENT FOR AN ELECTRONIC DEVICE

CROSS-REFERENCE TO RELATED APPLICATION(S)

This application is a continuation patent application of U.S. patent application Ser. No. 14/875,402, filed Oct. 5, 2015 and titled "Cover Glass for Covering a Camera of an Electronic Device," which is a continuation patent application of U.S. patent application Ser. No. 14/103,661, filed Dec. 11, 2013 and titled "Cover Glass Arrangement for an Electronic Device," now U.S. Pat. No. 9,154,678, the disclosures of which are hereby incorporated herein by reference in their entireties.

TECHNICAL FIELD

The present invention relates generally to electronic devices, and more specifically, to cameras in electronic devices. Still more particularly, the present invention relates to a cover glass arrangement for a camera included in an electronic device.

BACKGROUND

Figure 1:
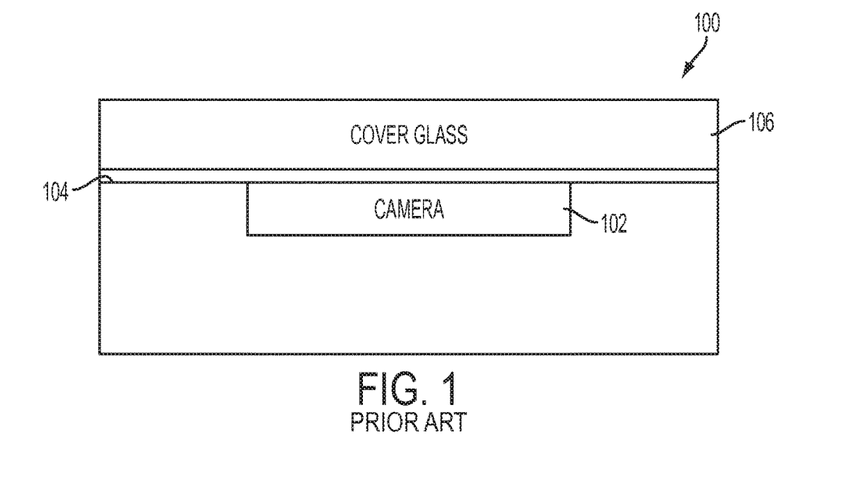
FIG. 1 is a cross-sectional view of a prior art electronic device.

Many electronic devices, such as smart telephones, laptop computers, and tablet computing devices include a camera to capture images and video. FIG. 1 is a cross-sectional view of a prior art electronic device. The electronic device 100 includes a camera 102 positioned adjacent to a surface 104 of the electronic device. The surface can be the front or the back surface of the electronic device 100. In some devices, a cover glass 106 is disposed over the surface 104 when the camera 102 is positioned adjacent to the front surface of the electronic device 100. The cover glass 106 can provide various functions or features for the electronic device. For example, in some embodiments, the cover glass 106 can be a touchscreen and provide an aperture for a speaker and microphone.

In some embodiments, the cover glass 106 can constrain the amount of space that is available to the camera 102. As a result, the functionality of the camera can be limited. For example, a flash module may not be included in the electronic device, or the camera may not include an autofocus feature or a high quality lens.

SUMMARY

In one aspect, an electronic device can include a camera and a first cover glass disposed over the camera. An opening can be formed through the first cover glass over a light-receiving region of the camera. A second cover glass can be positioned in the opening over the light-receiving region of the camera. A thickness of the second cover glass is less than a thickness of the first cover glass. In some embodiments, the second cover glass is a lens for the camera.

In another aspect, an electronic device can include a camera and a monolithic cover glass disposed over the camera. The cover glass includes a thinner region that is positioned over a light-receiving region of the camera. The thinner region can act as a lens for the camera.

In yet another aspect, a method for producing an electronic device can include providing a first cover glass having an opening formed through the first cover glass, and providing a second cover glass in the opening. A location of the opening corresponds to a light-receiving region of a camera. A thickness of the second cover glass is less than a thickness of the first cover glass.

In another aspect, a method for providing an electronic device can include providing a camera in the electronic device, and providing a monolithic cover glass over the camera. The cover glass includes a thinner region that is positioned over a light-receiving region of the camera.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide a cover glass arrangement for an electronic device that includes one or more cameras. The cover glass arrangement can include a first cover glass and a second cover glass, where the second cover glass is positioned in an opening formed through the first cover glass. In one embodiment, the second cover glass can be disposed over a light-receiving region of a camera. In another embodiment, the second cover glass is positioned over the light-receiving region and at least part of one or more non-light receiving regions of the camera.

The second cover glass can have a thickness that is less than the thickness of the first cover glass. The thinner second cover glass can provide additional space for the camera and/or for an optional lens. In some embodiments, a higher quality camera can be included in an electronic device when the additional space is provided by the thinner second cover glass. For example, a higher quality camera can include a larger sensor, higher quality lenses, an autofocus feature, and/or a flash module.

In another embodiment, the cover glass arrangement can include a monolithic cover glass that includes a thinner region formed in the cover glass. The thinner region can be disposed over the light-receiving region, or over the light-receiving region and at least part of one or more non-light receiving regions of the camera. Like the second cover glass, the thinner region can provide additional space for the camera and/or for an optional lens.

Figure 2A:
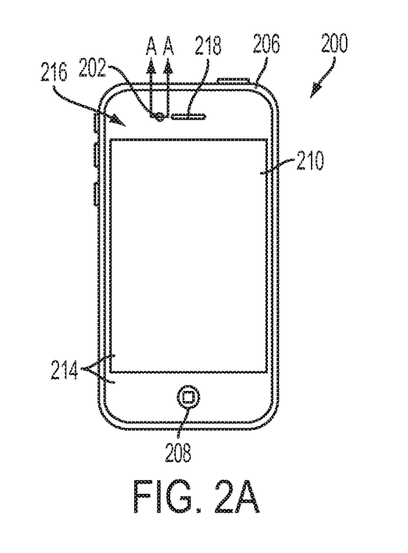
FIG. 2A illustrates a front perspective view of one example of an electronic device that includes one or more cameras.
Figure 2B:
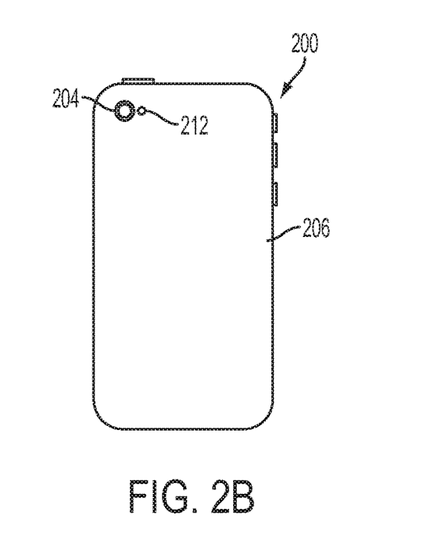
FIG. 2B depicts a rear perspective view of the electronic device 200 shown in FIG. 2A.

Referring now to FIGS. 2A-2B, there are shown front and rear perspective views of one example of an electronic device that can include one or more cameras. The electronic device 200 includes a first camera 202, a second camera 204, an enclosure 206, a display 210, an input/output (I/O) member 208, and an optional flash 212 or light source for the camera or cameras. The electronic device 200 can also include one or more internal components (not shown) typical of a computing or electronic device, such as, for example, one or more processors, memory components, network interfaces, and so on.

In the illustrated embodiment, a cover glass 214 is disposed over the front surface 216 of the electronic device 200. The cover glass 214 can be made of any suitable material, including, but not limited to, glass, plastic, acrylic, sapphire, and various combinations thereof. One or more portions of the cover glass 214 can be an input region for a touch sensing device and/or a force sensing device. The cover glass 214 can include one or more apertures, such as an aperture for a speaker and/or a microphone 218 and the I/O member 208. In the illustrated embodiment, the cover glass 214 is positioned over the entire front surface 216 of the electronic device. Thus, the cover glass 214 is disposed over the display, the first camera 202, and the enclosure 206. In other embodiments, the cover glass 214 can be disposed over one or more portions of a surface or surfaces of the electronic device.

As shown in FIGS. 2A-2B, the electronic device 200 is implemented as a smart telephone. Other embodiments, however, are not limited to this type of electronic device. Other types of computing or electronic devices can include one or more cameras, examples of which include a netbook or laptop computer, a tablet computing device, a wearable computing or display device such as a watch or glasses, a digital camera, a printer, a scanner, a video recorder, and a copier.

The enclosure 206 can form an outer surface or partial outer surface and protective case for the internal components of the electronic device 200, and may at least partially surround the display 210. The enclosure 206 can be formed of one or more components operably connected together, such as a front piece and a back piece. Alternatively, the enclosure 206 can be formed of a single piece operably connected to the display 210.

The I/O member 208 can be implemented with any type of input or output member. By way of example only, the I/O member 208 can be a switch, a button, a capacitive sensor, or other input mechanism. The I/O member 208 allows a user to interact with the electronic device 200. For example, the I/O member 208 may be a button or switch to alter the volume, return to a home screen, and the like. The electronic device can include one or more input members or output members, and each member can have a single I/O function or multiple I/O functions.

The display 210 can be operably or communicatively connected to the electronic device 200. The display 210 can be implemented with any type of suitable display, such as a retina display or an active matrix color liquid crystal display. The display 210 can provide a visual output for the electronic device 200 or function to receive user inputs to the electronic device. For example, the display 210 can be a multi-touch capacitive sensing touchscreen that can detect one or more user touch and/or force inputs.

Figure 3:
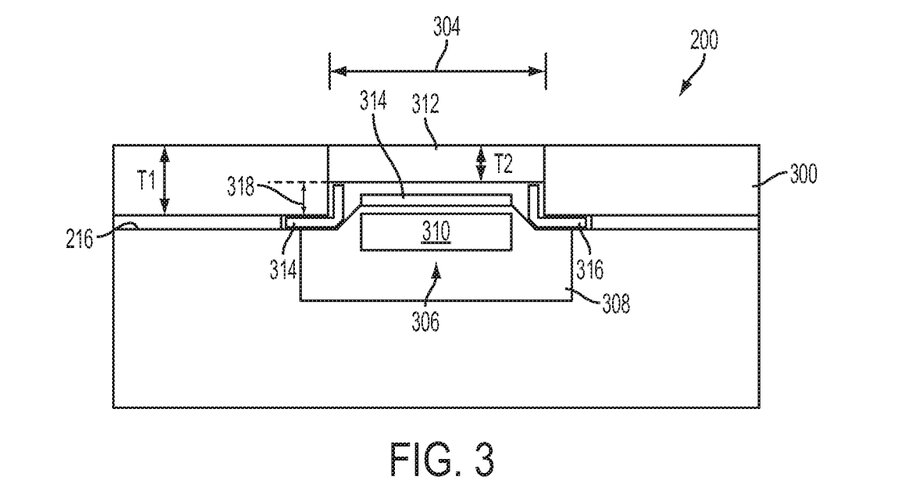
FIGS. 3-5 are simplified cross-section views of examples of the electronic device 200 taken along line A-A in FIG. 2A.
Figure 4:
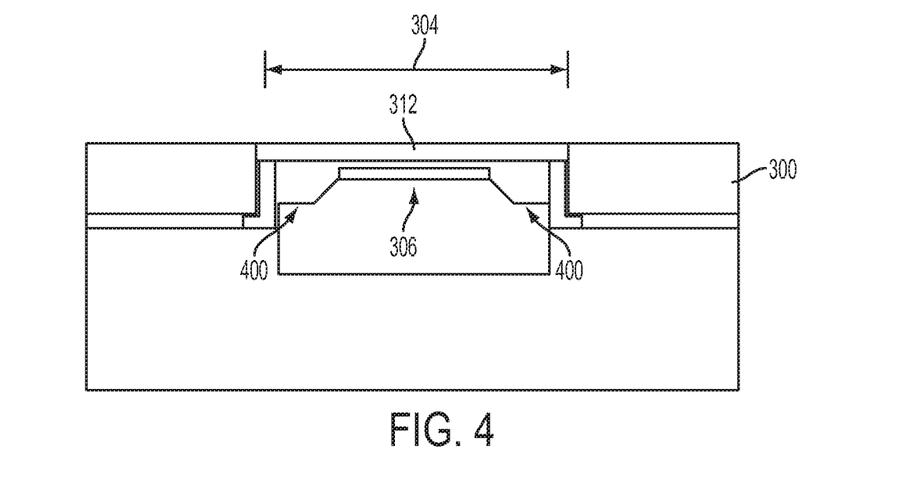
Figure 5:
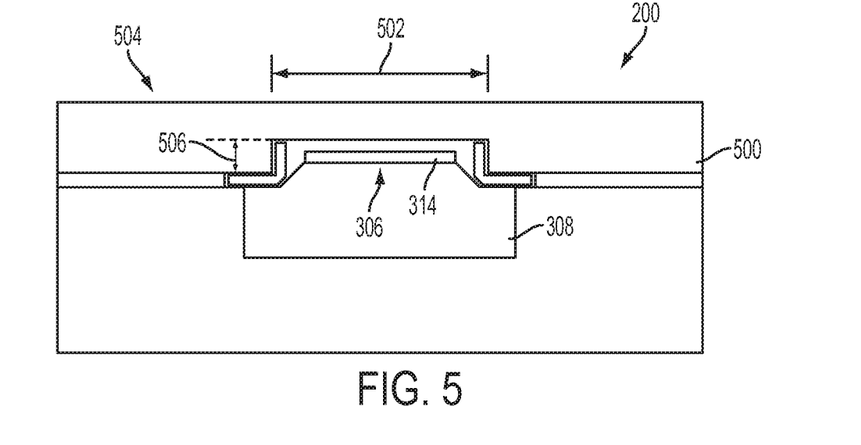

FIGS. 3-5 are simplified cross-sectional views of examples of the electronic device 200 taken along line A-A in FIG. 2A. As shown in FIG. 3, a first cover glass 300 is disposed over the surface 216 of the electronic device 200. The first cover glass 300 has a thickness T1. An opening 304 can be formed through the first cover glass 300 around the light-receiving region 306 of a camera 308. In some embodiments, the light-receiving region of the camera is associated with one or more image sensors 310 included in the camera.

A second cover glass 312 can be disposed in the opening 304. The second cover glass 312 has a thickness T2, and T2 is less than T1. The thinner second cover glass 312 can be made of any suitable material, including, but not limited to, sapphire, glass, acrylic, plastic, and various combination thereof. In some embodiments, the second cover glass 312 is a first lens in optical communication with the camera 308. Additionally or alternatively, a second lens 314 can be positioned between the second cover glass 312 and the camera 308. The second lens 314 can be formed with one or more lenses that each have any given shape and dimensions. Example shapes include, but are not limited to, circular, lozenge, or triangular.

The second cover glass 312 can attach to one or more brackets 316. The bracket or brackets 316 can have any given configuration and size, and can be positioned at any location. Additionally or alternatively, the second cover glass 312 can be attached to a frame (not shown) that attaches to the first cover glass 300. Any suitable attachment mechanism can be used to attach the second cover glass 312 to the bracket(s) 316 and/or to the frame. By way of example only, an adhesive material and/or a fastener can be used to attach the second cover glass 312 to the bracket(s) 316 and/or to the frame.

The opening 304 and the thinner second cover glass 312 provides additional space 318 for the camera 308 and/or the optional second lens 314. In some embodiments, a higher quality camera can be included in the electronic device 200 when the additional space 318 is present. For example, a higher quality camera can include a larger sensor, higher quality lenses, an autofocus feature, and/or a flash module. In some embodiments, a front-facing camera (e.g., camera 202) can be of equal or near-equal quality as a rear-facing camera (e.g., camera 204).

The embodiment shown in FIG. 4 is similar to the embodiment shown in FIG. 3 except that the opening 304 in the first cover glass 300 is larger. The second cover glass 312 is disposed over the light-receiving region 306 and at least part of one or more non-light receiving regions 400 of the camera.

The cross-sectional view in FIG. 5 includes a monolithic cover glass 500. The cover glass 500 has a region 502 that is thinner than other areas 504 of the cover glass 500. Region 502 can have any given shape and dimensions. The thinner region 502 can be disposed over the light-receiving region 306 of the camera 308. Additionally, the thinner region 502 can have a size and/or shape that positions the thinner region over some or all of the non-light receiving regions of the camera 308. Like the first and second cover glasses 300 and 312, the cover glass 500 can be make of any suitable material such as sapphire, glass, plastic, and various combinations of materials.

In some embodiments, the thinner region 502 can be shaped such that the thinner region acts as a lens. The lens can be in optical communication with the light-receiving region 306 of the camera 308. Additionally or alternatively, the second lens 314 can be positioned between the cover glass 500 and the camera 308. The thinner region 502 provides additional space 506 for the camera 308 and/or the optional second lens 314.

Figure 6:
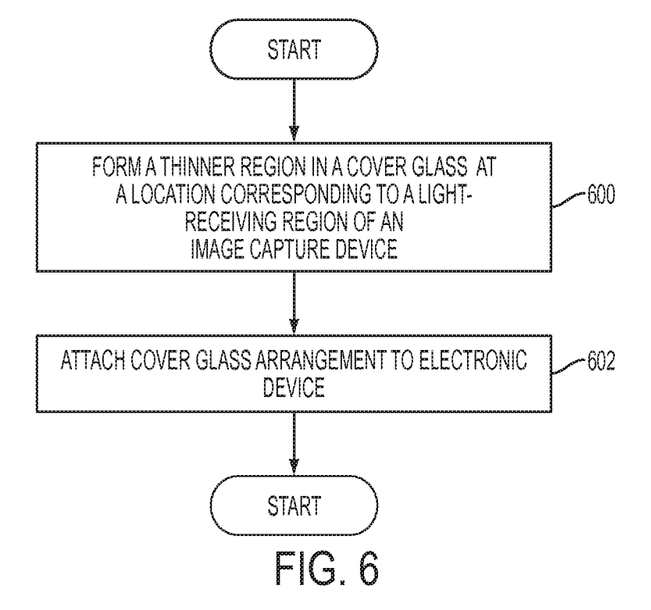
FIG. 6 is a flowchart of a method for producing the cover glass arrangement shown in FIG. 5.

FIG. 6 is a flowchart of a method for producing the cover glass arrangement shown in FIG. 5. Initially, a thinner region can be formed in a monolithic cover glass, as shown in block 600. The thinner region can be formed with any known cutting, shaping, or trimming process. The location of the thinner region can correspond to a light-receiving region of a camera, or to the light-receiving region and at least a part of one or more non-light receiving regions of the camera.

Next, as shown in block 602, the cover glass arrangement can be attached to the electronic device. As described earlier, any suitable attachment mechanism can be used to connect the cover glass arrangement to the electronic device. For example, an adhesive material and/or a fastener can attach the cover glass arrangement to the electronic device.

Figure 7:
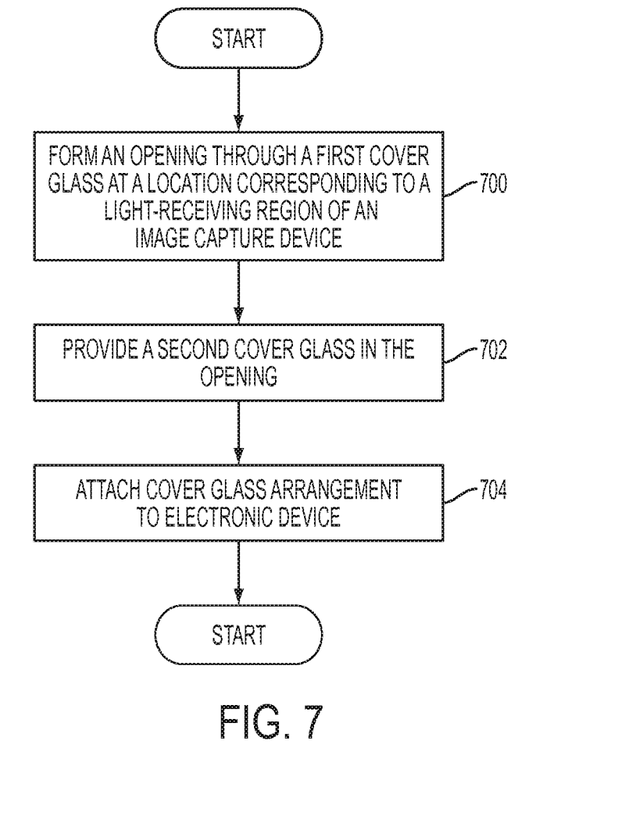
FIG. 7 is a flowchart of a method for producing the cover glass arrangement shown in FIGS. 3-4.

FIG. 7 is a flowchart of a method for producing the cover glass arrangement shown in FIGS. 3-4. Initially, an opening can be formed through a first cover glass (block 700). The opening can be formed using any suitable process. For example, the opening can be formed through the first cover glass by etching or grinding the first cover glass. The location of the opening can correspond to the light-receiving region of a camera, or to the light-receiving region and at least a part of one or more non-light receiving regions of the camera.

A second cover glass can then be positioned in the opening, as shown in block 702. The thickness of the second cover glass is less than the thickness of the first cover glass. The cover glass arrangement can then be attached to the electronic device. In one embodiment, the first cover glass is affixed to a frame in the electronic device. The second cover glass can be attached to the first cover glass, to one or more brackets, and/or to the frame attached to the first cover glass.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible. For example, although the embodiments shown in FIGS. 3-5 depict the front-facing first camera 202 (FIG. 2), those skilled in the art will recognize that the invention can be used with the rear-facing second camera 404. Additionally, a cover glass arrangement can include multiple openings with a second cover glass positioned in each opening, or multiple thinner regions formed in a cover glass. Additionally or alternatively, a cover glass arrangement can include both one or more openings with a second cover glass positioned in each opening and one or more thinner regions.

What is claimed is:

1. An electronic device, comprising:
an enclosure comprising:
a back portion; and
a monolithic glass cover attached to the back portion;
a sensor positioned within the enclosure;
wherein the monolithic glass cover comprises:
a first side defining an exterior surface of the electronic device; and
a second side opposite the first side and having a recessed region aligned with the sensor, wherein a thickness of the monolithic glass cover in the recessed region is less than a thickness of the monolithic glass cover in a peripheral region around the recessed region.

2. The electronic device of claim 1, wherein the sensor extends at least partially into the recessed region.

3. The electronic device of claim 1, wherein the first side of the monolithic glass cover is substantially planar above the recessed region.

4. The electronic device of claim 1, wherein the sensor is an image sensor.

5. The electronic device of claim 4, wherein the recessed region defines a lens in optical communication with the image sensor.

6. The electronic device of claim 1, further comprising a display positioned within the enclosure, wherein the monolithic glass cover covers at least part of the display.

7. The electronic device of claim 1, wherein the electronic device is a mobile phone.

8. A notebook computer, comprising:
an enclosure defining an internal volume of the notebook computer and comprising:
a back portion; and
a glass cover coupled to the back portion and comprising:
a first region having a first thickness; and
a second region having a second thickness less than the first thickness;
a display within the internal volume and below the first region of the glass cover; and
a sensor within the internal volume and below the second region of the glass cover.

9. The notebook computer of claim 8, wherein the glass cover defines an input surface of the notebook computer.

10. The notebook computer of claim 9, further comprising a touch sensing device associated with the input surface.

11. The notebook computer of claim 10, wherein the touch sensing device comprises a capacitive sensor.

12. The notebook computer of claim 9, further comprising a force sensing device associated with the input surface.

13. The notebook computer of claim 8, wherein the sensor is an image sensor.

14. The notebook computer of claim 8, wherein:
the glass cover defines an aperture; and
the notebook computer further comprises an input member disposed in the aperture.

15. An electronic device, comprising:
a back portion defining part of an enclosure of the electronic device;
a glass sheet coupled to the back portion and defining:
a user input surface of the electronic device; and
a recess in a back surface opposite the user input surface; and
a sensor positioned within the electronic device and extending at least partially into the recess.

16. The electronic device of claim 15, wherein the sensor is associated with a camera.

17. The electronic device of claim 15, wherein:
the recess is a first recess;
the sensor is a first sensor; and
the electronic device further comprises:
a group of second recesses; and
a group of second sensors, each respective second sensor extending at least partially into a respective second recess.

18. The electronic device of claim 15, further comprising a multi-touch sensor positioned in the enclosure and configured to sense touch inputs applied to the user input surface.

19. The electronic device of claim 18, further comprising a display positioned in the enclosure and configured to display visual output through the user input surface of the glass sheet.

20. The electronic device of claim 15, wherein:
the back portion defines a back surface and side surfaces of the enclosure; and
the glass sheet defines a front surface of the enclosure.

* * * * *